Dec. 18, 1923.
N. E. WARD
LOG BARKING MACHINE
Filed Aug. 7, 1922
1,478,193
2 Sheets-Sheet 1
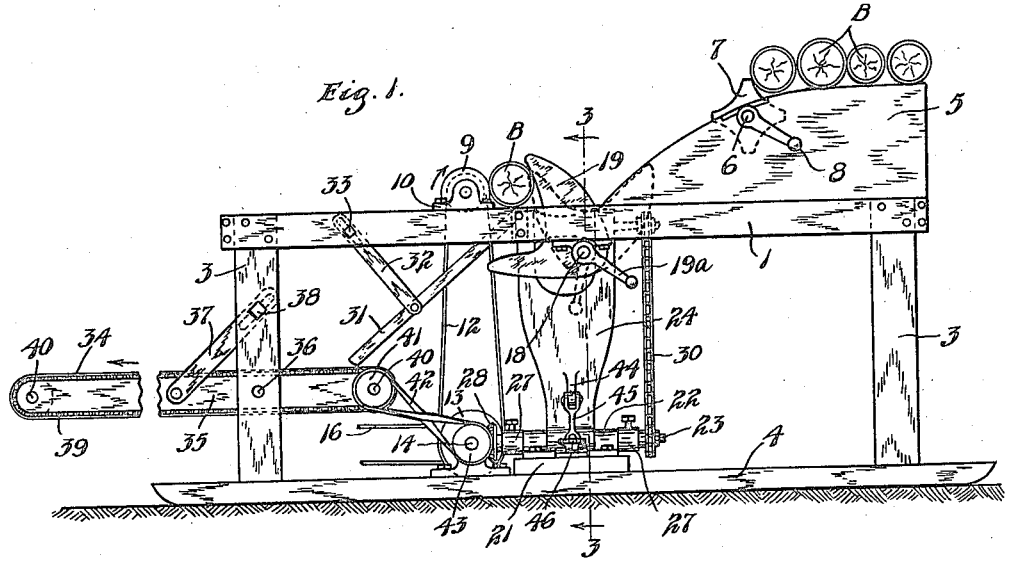
INVENTOR.
NEVEN E. WARD.
BY HIS ATTORNEY.
James F. Williamson

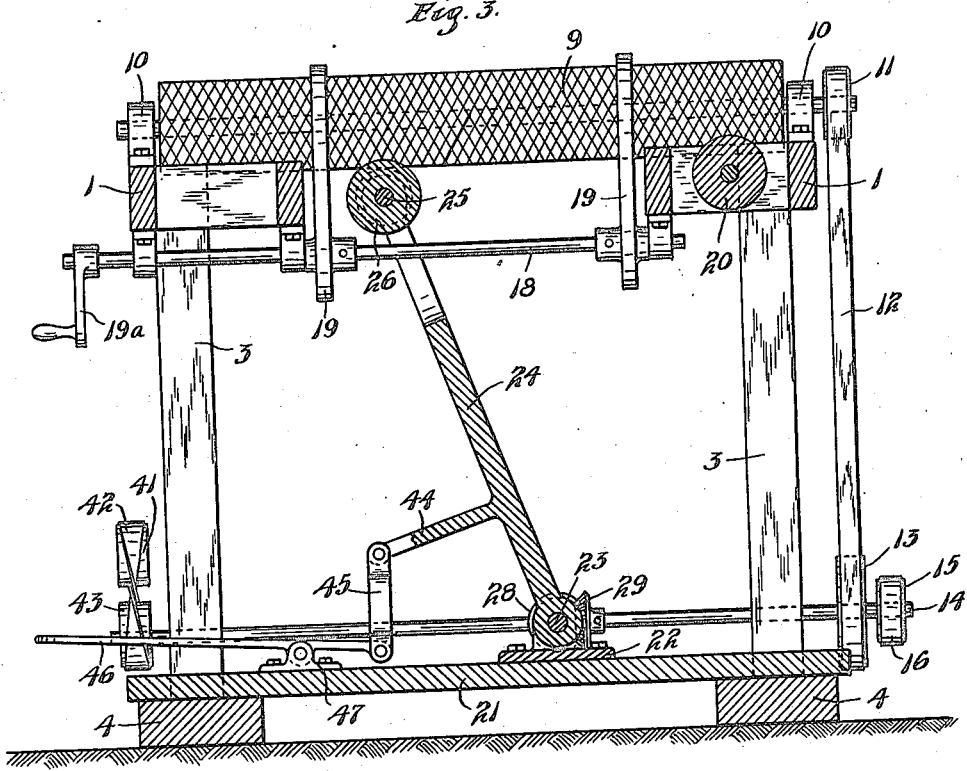

Patented Dec. 18, 1923.

1,478,193

UNITED STATES PATENT OFFICE.

NEVEN EDWARD WARD, OF NORTHOME, MINNESOTA.

LOG-BARKING MACHINE.

Application filed August 7, 1922. Serial No. 580,132.

*To all whom it may concern:*

Be it known that I, NEVEN E. WARD, a citizen of the United States, residing at Northome, in the county of Koochiching and State of Minnesota, have invented certain new and useful Improvements in Log-Barking Machines; and I do hereby declare the following to be a full, clear, and exact description of the invention, such as will enable others skilled in the art to which it appertains to make and use the same.

This invention relates to a machine for removing the bark from logs, which logs are to be used for making paper pulp. The machine is designed to be transported in and used in the woods in various places near the points where the timber is cut. It has heretofore been the practice to peel the bark off of the pulp logs by hand but it is becoming quite difficult to secure labor for this work. Furthermore, the bark sets on the tree at certain seasons and if hand peeling is done, the cutting must stop as soon as the bark sets.

It is an object of this invention, therefore, to provide a machine which will quickly and efficiently peel the bark from logs whether the bark is loose and green thereon or whether the same is set or frozen on the logs.

It is another object of the invention to provide a machine comprising a rotating studded roller against which the logs are held with freedom for rotation.

It is another object of the invention to provide such a machine having means for easily and quickly feeding the separate logs to the barking mechanism and for quickly discharging the logs and bark from the machine.

These and other objects and advantages of the invention will be fully set forth in the following description made in connection with the accompanying drawings in which like reference characters refer to the same parts throughout the different views, and in which—

Fig. 1 is a view in side elevation of the machine;

Fig. 2 is a plan view thereof;

Fig. 3 is a vertical section taken on the line 3—3 of Fig. 1 shown on an enlarged scale;

Fig 4 is a plan view of the developed surface of the studded roller shown on an enlarged scale;

Fig. 5 is a vertical section taken on the line 5—5 of Fig. 4;

Fig. 6 is a plan view of the developed surface of the discharging roller shown on an enlarged scale;

Fig. 7 is a vertical section taken on the line 7—7 of Fig. 6; and

Fig. 8 is a vertical section similar to Fig. 5 showing a modification.

Referring to the drawings, the machine comprises a frame having spaced longitudinal members 1 and end members 2, which frame is supported upon spaced legs 3 shown as formed of heavy timbers which are carried by a skid frame having spaced skids 4 thereon. Mounted on the frame between the members 1 and extending thereabove are slide members 5 having curved upper surfaces. These members have bearings set therein in which a shaft 6, extending transversely of said members, is journaled. The shaft 6 carries spaced feeding disks or plates 7 having arcuate notches therein, said plates being disposed adjacent the inner sides of the members 5 and adapted to be rotated with the shaft 6 by means of a hand crank 8 secured to said shaft and disposed at one side of the machine. A barking roller 9 of general cylindrical shape extends transversely of and between the members 1 and has shafts projecting from its ends journaled in bearings 10 secured to the upper surface of the members 1 and having at one end a pulley member 11 driven by a belt 12 from a pulley member 13 secured on a main driving shaft 14 journaled in bearings 15 bolted to the top of skids 4. Shaft 14 has a driving pulley 15 at one end thereof adapted to be driven by a belt 16 from a suitable motor or source of power. The roller 9 which preferably will be formed of metal, has its surface provided with upstanding studs 17 or 17ª shown as of the general shape of pyramids with the tops either sharp or slightly flattened, said studs being slightly separated on said surface at their bases, as shown in Figs 4, 5 and 8. The members 5 have horizontal portions projecting forwardly from the upwardly curved portions, which horizontal portions are substantially in the same plane as the tops of the members 1. A shaft 18 is journaled in bearings secured to the bottom of members 1 and extends transversely therebetween. This shaft has secured thereto immediately inside the members 5 spaced members 19. These members 19 are of general crescent shape, as shown in Fig. 1, with one horn of the crescent slightly larger than the other. The shaft 18 extends to one side of the frame and is provided with a crank handle 19ª. A roller member 20 of general cylindrical shape is journaled in cross pieces extending between members 1 and 5 at one side of the machine, which roller is transversely alined with the concave portion of the crescent members 19 when the same occupy the position shown in dotted lines in Fig. 1. A base member 21 extends across above the skid members 4 and has spaced bearings 22 bolted thereto intermediate its ends, in which bearings is journaled a shaft 23. This shaft forms a pivot for a swinging frame 24 having a hub disposed on said shaft between the bearings 22 and extending vertically therefrom. The frame 24 is bifurcated at its upper end and provided with bearings in which is journaled a shaft 25, on which shaft is secured a roller 26 having a concave surface and which is disposed between said bearings. Shaft 25 carries a sprocket driven by a chain 30 from a sprocket carried on the end of shaft 23. The shaft 23 is held against longitudinal movement by collars 27 secured thereto by suitable set screws and has secured to its end opposite the end carrying the sprocket a beveled gear 28 meshing with and driven by another gear 29 secured to the main driving shaft 14. With this construction the roller 26 is rotated from the shaft 14. The frame member 24 normally occupies the inclined position shown in Fig. 3 but is adapted to be swung to a substantially vertical position, and for this purpose, is provided with a projecting arm 44 pivotally connected by a link 45 to a treadle lever 46 pivoted intermediate its ends in a bearing 47 bolted to the member 21.

A chute or deflecting board 31 is mounted between the members 1 and extends downwardly in an inclined position beneath the roller 9, being mounted for adjustable movement by links 32 pivoted thereto and having slots at their other ends receiving clamping bolts 33 passing through the members 1. An endless conveyor 34 is carried on a frame 35 pivotally mounted in trunnions 36 in the forward members 3, which frame is swingingly and adjustably secured to said members 3 by links 37 pivoted at their lower ends to said frame and provided with slots at their other ends through which pass clamping bolts 38 extending through the members 3. The conveyor is driven by a sprocket chain 39 running over sprockets secured to shafts 40 disposed in the ends of the frame 35, the rear one of which is extended and provided with a pulley 41 driven by a cross belt 42 from a pulley 43 secured on one end of the driving shaft 14.

The logs to be operated on are brought down a suitable chute and pass onto the members 5 at the rear of the machine and are indicated as B in Fig. 1. These logs are singly delivered down the inclined surface of the members 5 by turning the crank 8. The arms formed by the curved notches in the members 7 pass between the successive logs and retain the succeeding logs in position allowing but one log to pass at a time. The log moves down the slide formed by members 5 and onto these members and the members 1 into the concave portion of the members 19 and between the horns thereof. The operator now swings the crank 19ª and the crescent members 19 which form a cradle swing the log against the roller 9 into the position indicated in Fig. 1. Power being applied to the machine the roller 9 is driven at high speed, preferably about 900 and 1000 revolutions per minute. The roller turns in the direction indicated by the arrows on Fig. 1, and as the log B is pressed against the same, the bark is very quickly peeled from said log, the log rotating during this operation against the members 19. As soon as the bark has been stripped from the log, the operator swings the crank 19ª and the members 19 back to the position shown in dotted lines in Fig. 1. He then steps upon the treadle lever 46 and the roller 26 which is normally below the top surface of the members 1 swings upwardly into contact with the underside of the log. This roller 26 has its surface provided with studs or corrugations 48, as shown in Figs. 6 and 7. The log is thus lifted slightly and is rapidly ejected laterally from the machine passing over the roller 20 which facilitates its passage. The bark which is peeled from the log drops onto the board or chute 31 and is directed downwardly onto the conveyor 34 by which it is conveyed forwardly away from the machine. The roller 26 is driven at less speed than the barking roller and preferably in the neighborhood of 450 revolutions per minute. It will be noted that as the cradle members 19 swing rearwardly after the log has been barked, the log will lie in the concave thereof substantially in alinement with rollers 20 and 26. It is thus in proper position to be quickly ejected. As soon as the log has been ejected from the machine the crank 8 will be operated to permit another log to pass to the roller and the successive logs will thus be quickly and efficiently handled. The conveyor 34 and the chute 31 can be adjusted, as desired, for the proper disposition of the bark.

From the above description it is seen that applicant has provided a very simple and efficient machine for the purpose intended. The machine is easily made from standard timbers and can be easily transported to the desired spot where it will be connected to a suitable steam or gas engine, or other available motor. With this machine, the bark can be quickly peeled from the pulp logs at any time, and as soon as the same are cut, and it is unnecessary to regulate the cutting to suit the convenience of the peeling operations.

It will, of course, be understood that various changes may be made in the form, details and arrangement of the parts without departing from the scope of applicant's invention, which, generally stated, consists in the matter shown and described and set forth in the appended claims.

What is claimed is:

1. A barking machine having in combination, a revoluble driven cylinder having a studded periphery, a runway, a cradle comprising transversely spaced crescent-shaped members for singly receiving the logs adapted to move to swing the logs against said cylinder, means for swinging said cradle to hold the logs against said cylinder, and means disposed below said cradle adapted to be raised in contact with said log and to eject the same endwise from the machine.

2. A machine for removing the bark from pulp logs having in combination, a driven revoluble cylinder having its surface covered with abrading projections, a runway for the logs, a swinging cradle comprising spaced concave members adapted to receive a log from said runway to move the same against said cylinder and means for turning said cradle to hold and force the log against said cylinder whereby the log is revolved in the cradle by said cylinder and the bark removed therefrom.

3. A machine for removing the bark from pulp logs having in combination, a driven revoluble barking cylinder, means for receiving a log, moving and holding the same against said cylinder, and permitting rotation of said log by said cylinder, and movable means for engaging and ejecting said log from the machine, said last mentioned means comprising a rotating roller having a roughened surface and adapted to be moved against the underside of said log.

4. The structure set forth in claim 3, the last mentioned means comprising a vertically swinging concave roller having its axis disposed substantially perpendicular to the axis of said barking cylinder.

5. A machine for removing the bark from logs having in combination, a frame having spaced slides for the log, feeding means for delivering the logs singly thereto, a barking member comprising a rotating studded cylinder, means comprising spaced concave members for holding the log against said cylinder, and a discharging roller having its axis substantially at right angles to the axis of said cylinder and normally disposed with its surface below said slides but movable upwardly to engage said log and discharge the same from the machine.

6. A portable bark removing machine having in combination, a frame, a driven barking cylinder extending transversely thereof, means for feeding logs singly on said frame, means for singly receiving and swinging said logs, holding the same against said barking cylinder with freedom for rotation thereby, means for discharging the removed bark from the machine, and means for directing said bark onto the last mentioned means.

7. A portable barking machine having in combination, a driven barking cylinder having an abrading surface, spaced slides extending transversely to said cylinder, means beneath said slides and swinging parallel thereto adapted to receive the log and move the same against said cylinder, a driven roller disposed with its axis at an angle to the axis of said cylinder swingable in a vertical plane substantially in line with said means when the latter is in log-receiving position and normally disposed below said slides but movable upwardly thereabove to engage and discharge a log.

8. The structure set forth in claim 7, and a common driving shaft from which said cylinder and roller are driven.

In testimony whereof I affix my signature.

NEVEN EDWARD WARD.